United States Patent [19]
Clyne

[11] 3,719,978
[45] March 13, 1973

[54] IDLER MEMBER AND METHOD OF ROUGHENING A PORTION OF THE EXTERIOR SURFACE THEREOF

[76] Inventor: Robert W. Clyne, 5701 North Sheridan Road, Chicago, Ill. 60626

[22] Filed: July 29, 1971

[21] Appl. No.: 167,358

[52] U.S. Cl. ............................................. 29/121 R
[51] Int. Cl. ...................................... B21b 27/02
[58] Field of Search .29/121 R, 121 A, 132; 198/154, 198/55

[56] References Cited

UNITED STATES PATENTS

| | | | |
|---|---|---|---|
| 1,035,959 | 8/1912 | Goldsmith | 29/121 R UX |
| 2,623,732 | 12/1952 | Morgan | 29/121 R UX |
| 2,675,596 | 4/1954 | Singer | 29/121 R X |
| 2,695,248 | 11/1954 | Ornitz et al. | 29/132 X |
| 2,773,300 | 12/1956 | Clements | 29/121 A UX |
| 3,241,216 | 3/1966 | Wellendorf | 29/121 R X |
| 3,303,920 | 2/1967 | Clyne | 198/55 X |

*Primary Examiner*—Alfred R. Guest
*Attorney*—Albert H. Pendleton et al.

[57] ABSTRACT

An idler member is provided for use in changing the direction of travel of a moving web. The member has a cylindrical exterior surface which is adapted to be engaged by the moving web. A portion of the said exterior surface has fused thereto material deposits which are adapted to increase the frictional engagement between the idler member and the web.

3 Claims, 4 Drawing Figures

PATENTED MAR 13 1973   3,719,978

IDLER MEMBER AND METHOD OF ROUGHENING A PORTION OF THE EXTERIOR SURFACE THEREOF

BACKGROUND OF THE INVENTION

Oftentimes in heavy industrial machinery utilizing conveyors or the like, problems are encountered when the direction of travel of the conveyor is to be changed. Idlers in the form of rollers or sprockets are normally utilized depending upon the type of conveyor being used and the load to which the conveyor is subjected during use. In waste handling equipment, for example, such as disclosed in my U.S. Pat. No. 3,303,920, it is often difficult to effect a change in the direction of travel of a flighted conveyor utilized in such equipment without excessive wear developing. The conveyor in such a situation normally includes a pair of endless chains or belts which are disposed in spaced parallel planes and are adapted to operate in unison through a predetermined path. Corresponding portions of the chains or belts are interconnected by elongated transversely extending flights. During one segment of travel, each flight moves across a first surface on which heavy waste products have accumulated. The flights engage the accumulated products and move same towards one side of the first surface and then up along a second surface to an elevated discharge station. Idler members in such equipment are utilized at the juncture of the two surfaces to effect a change in the direction of travel of the flighted conveyor so as to correspond to the angular disposition of the surfaces. Heretofore where sprocket type idlers were utilized for this purpose, difficulty was frequently encountered when the conveyor was subjected to loads, in that the chains would become disengaged from the sprocket teeth thereby necessitating shut down of the equipment. On the other hand, when conventional rollers were used, frequently insufficient friction was developed between the rollers and belt or chain to cause the rollers to rotate about their axes. The net effect of this latter condition was that an inordinate amount of wear occurred in the belts or chains and/or the rollers. Furthermore, where the roller did not rotate, a greater amount of power was normally expended in driving the conveyor.

Because the idlers in waste handling equipment are normally in contact with foreign material that adversely affects operation thereof, the friction usually developed between the belt or chain and the exterior of the rollers was not sufficient to overcome the adverse effects caused by the foreign material in impeding rotation of rollers; thus excessive slippage between the belts and rollers occurred.

SUMMARY OF THE INVENTION

Thus, it is an object of this invention to provide an idler member which is of simple, inexpensive construction and will operate effectively with a moving web so that the latter may readily undergo abrupt changes in the direction of travel.

It is a further object of this invention to provide an idler member having a roughened cylindrical exterior surface; the roughness of said surface being readily accomplished by a simple, inexpensive and expeditious method.

It is a still further object of this invention to provide a method of increasing the roughness of the exterior surface of an idler member notwithstanding the size and shape of the latter.

Further and additional objects will appear from the description, accompanying drawings, and appended claims.

In accordance with one embodiment of the invention an idler member is provided which has a cylindrical exterior surface. The idler member is adapted for use with an elongated moving web so as to effect a change in the direction of travel of said web. To increase the frictional engagement between the web and the cylindrical exterior surface of the idler member, deposits of materials (e.g., welding rod splatter) are fused onto said surface. The deposits of material encircle said surface in a random pattern.

DESCRIPTION

For a more complete understanding of the invention reference should be made to the drawing wherein.

Figure 1:
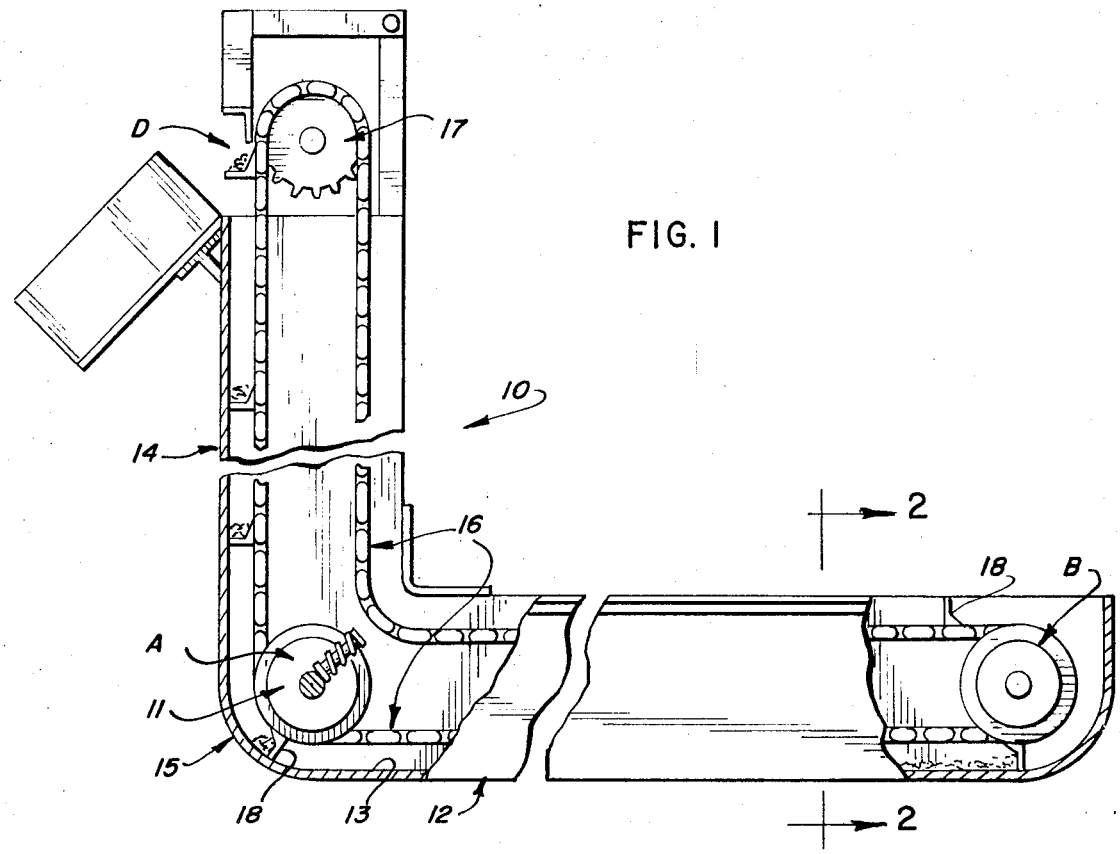
FIG. 1 is a fragmentary side elevational view of a waste handling apparatus utilizing the improved idler members.

Referring now to the drawing and more particularly to FIG. 1, one form of a waste product handling apparatus 10 is shown which may be generally of the type disclosed in U.S. Pat. No. 3,303,920. Apparatus 10 is merely illustrative of one type of equipment in which the improved idler member 11 may be utilized. It is to be understood, of course, that the improved idler member is not to be limited to such equipment, but may be incorporated in various other types of equipment wherein changes in the direction of travel of a web, belt, or a conveyor are required.

Apparatus 10 is adapted to be disposed within a suitable settling tank or the like, not shown, into which water having waste products suspended therein is discharged. The water remains for a predetermined period of time in a substantially quiescent state within the settling tank thereby enabling the suspended waste products to gravitate to the bottom of the tank.

Apparatus 10 comprises a frame having an elongated base section 12 which overlies and rests upon the tank bottom and conforms substantially to the shape thereof. The base section has an open top so that the gravitating waste products may accumulate on the floor 13 of said base section. Extending vertically upwardly from one side or end of the base section is a ramp section 14. The lower end of the ramp section is connected to the adjacent end of the base section by a uniformly curved section 15. The upper end of the ramp section 14 extends above the top of the settling tank and forms a discharge station D. The height of the ramp section and the length of the base section will depend upon the configuration of the settling tank.

Disposed within the assembly frame is an endless flighted conveyor 16 which, as shown in FIG. 1, is driven in clockwise direction by suitable drive means 17.

Figure 2:
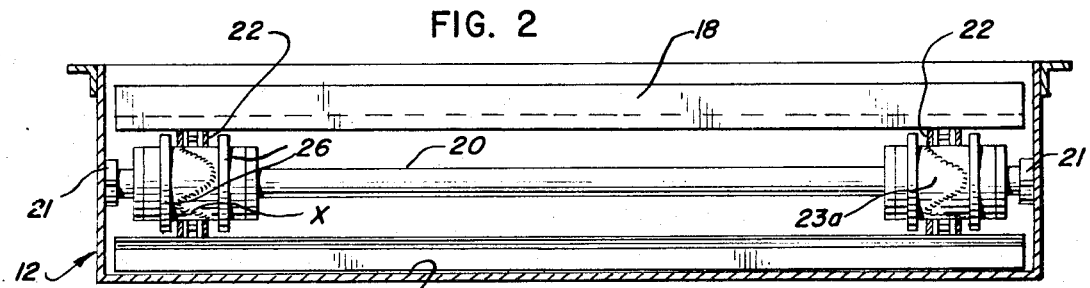
FIG. 2 is a fragmentary sectional view taken along line 2—2 of FIG. 1.

During movement of the conveyor 16, each flight 18 thereof is caused to pass over the floor 13 of the base section 12, around curved section 15 and up the ramp section 14. Each flight, during said segments of travel, engages the accumulated waste products, moves same to the curved section 15, and then up the ramp section 14 to the discharge station D. It is important that the flight be in close proximity to the respective surfaces of the base, curved and ramp sections during the aforementioned segments of travel so that substantially all the engaged waste products will be transported to the discharge station. To insure proper disposition of each flight as it passes over the floor, around the curved section and up the ramp section, sets A and B of the improved idler members 11 are utilized in conjunction with the drive means 17. The sets A and B of idler members are located at opposite ends of the base section 12 and are adapted to rotate about parallel, horizontally spaced axes. Each set of idler members comprises a pair of roller type idler members 11 which are keyed to a common shaft 20, see FIG. 2. The ends of the shaft are supported by suitable bearings 21 carried by the base section 12. The bearings 21 accommodating the shaft 20 of the idler members, adjacent the frame curved section 15, are spring biased towards the surface so as to maintain tautness of the conveyor chains or belts.

The relative positioning of the idler members on shaft 20 is such that each idler member will be aligned with one of the belts or chains 22 forming a part of the endless conveyor 16. The chains or belts work in unison and each moves within a vertical plane; said vertical planes being in spaced parallel relation.

Each flight 18 may be formed of a pair of blades or flanges which are obliquely disposed and extend transversely of the chains or belts and span substantially the distance between the opposite sides of the settling tank. Each flight is rigidly attached to corresponding links of the chains.

Figures 3, 4:
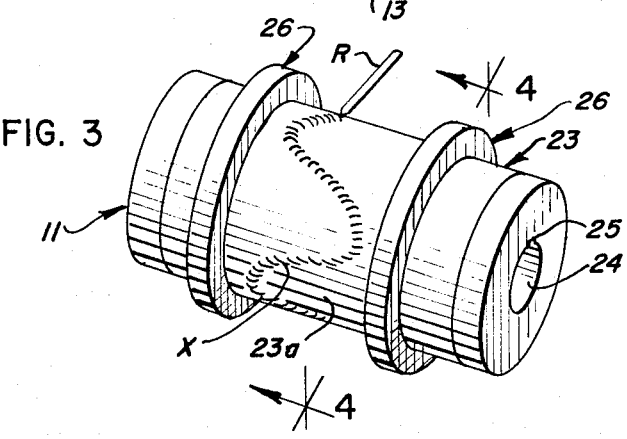
FIG. 3 is an enlarged perspective view of one form of the improved idler member showing material being deposited upon a portion of the exterior surface thereof to increase the roughness of said surface portion.
FIG. 4 is a sectional view taken along line 4—4 of FIG. 3.

Each idler member 11 may be of a type shown in FIGS. 3 and 4 and comprises a cylindrical element 23 of weldable material. Element 23 is provided with an axial bore 24 and keyway 25 through which the end of shaft 20 extends. A suitable key, not shown, carried by the shaft end fits into the keyway 25 formed in element 23. Mounted in axially spaced relation on element 23 is a pair of annular shoulders 26 between which a chain or belt of the flighted conveyor 16 passes. The central portion 23a of the cylindrical element is aligned with the chain or belt of the conveyor. Fused to the exterior surface of central portion 23a are deposits X of fusable material (e.g. welding rod splatter) which are arranged in random pattern, as seen in FIG. 3. The deposit may consist of a zig-zag bead which encircles the portion 23a. The deposits form a roughened exterior surface which greatly increases the frictional engagement between the idler member and the conveyor chain or belt. The pattern of the deposits may vary, as desired, and the thickness of said deposits will normally be nonuniform.

The preferred method of fusing the deposits X onto the exterior surface of central portion 23a is by electric welding. The deposits X are splatter from a welding rod R. The idler member 11 is normally held fast while the welding rod R is moved in a zig-zag path around the central portion 23a. Such a method is simple, inexpensive, and expeditious. The idler member 11, prior to the deposits being fused thereon, may be of standard construction.

Thus, it will be seen that an improved idler member has been provided which is of simple, inexpensive construction and has a portion of the exterior thereof roughened so as to greatly increase the frictional engagement between the idler member and a chain, belt, or web, whatever the case may be.

I claim:

1. A rotary idler member for use with a moving web to effect a change in the direction of travel of the latter, said member comprising a cylindrical exterior surface of weldable material, and a bead of welding rod splatter substantially encircling said exterior surface and being fused thereto to effect roughening thereof and adapted to be frictionally engaged by the moving web whereby the web imparts rotational movement to said idler member.

2. The idler member of claim 1 wherein said bead forms a random encircling pattern extending substantially the entire axial length of said exterior surface.

3. A rotary idler member for use in a waste handling apparatus wherein the latter has a continuous flighted conveyor movable in an endwise direction across a first surface and engaging waste accumulated thereon and then moving the engaged waste across a second surface extending angularly upwardly from the first surface to a discharge station, said idler member being mountable on the apparatus at the junction of the first and second surfaces and engageable with the conveyor, said idler member comprising a cylindrical exterior surface of weldable material, the axis of said exterior surface being coincident to the rotary axis of said idler member, and a bead of welding rod splatter substantially encircling said exterior surface and being fused thereto to effect roughening thereof to increase frictional engagement between said exterior surface and the conveyor.

* * * * *